Dec. 19, 1967 N. O. ROSAEN 3,358,842
CONTINUOUS FILTER
Filed Nov. 16, 1964 2 Sheets-Sheet 1

INVENTOR
NILS O. ROSAEN

BY Hauke & Hauke
ATTORNEYS

Dec. 19, 1967　　　　　N. O. ROSAEN　　　　　3,358,842
CONTINUOUS FILTER

Filed Nov. 16, 1964　　　　　　　　　　　　　　2 Sheets-Sheet 2

INVENTOR
NILS O. ROSAEN

BY Hauke & Hauke
ATTORNEYS

United States Patent Office 3,358,842
Patented Dec. 19, 1967

3,358,842
CONTINUOUS FILTER
Nils O. Rosaen, Bloomfield Hills, Mich. (1776 E. Nine Mile Road, Hazel Park, Mich. 48030)
Filed Nov. 16, 1964, Ser. No. 411,242
11 Claims. (Cl. 210—411)

ABSTRACT OF THE DISCLOSURE

A filter device including an axially separated filter chamber and cleaning chamber, a filter element normally carried in the filter chamber, and moving to the cleaning chamber when it needs cleaning, means for cleaning the element as it moves from the filter chamber to the cleaning chamber and for moving the element back to the filter chamber when it has been cleaned.

---

Figure 1:
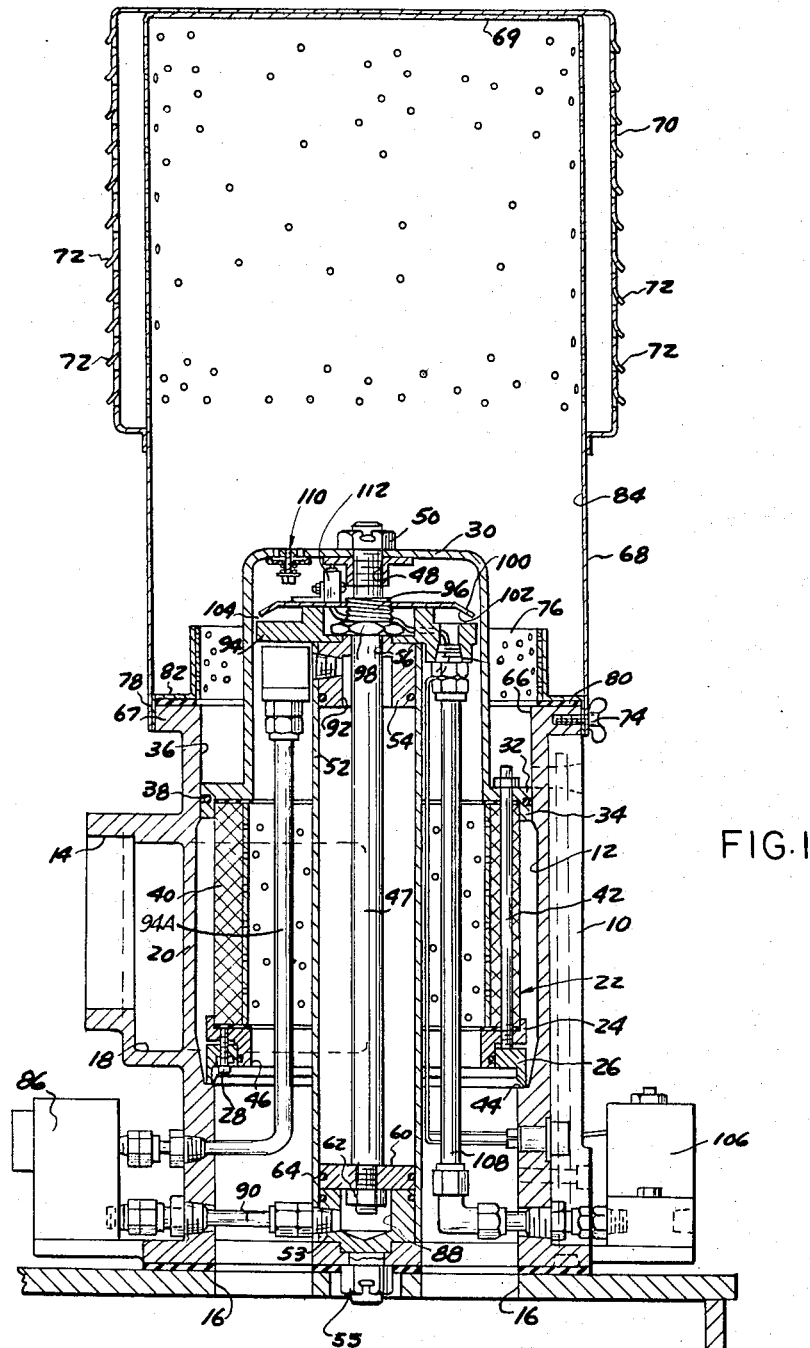

The present invention relates to fluid filtering devices and more particularly to such a device having means selectively operable to clean the filter element when it becomes clogged.

Filter elements for fluid fiiltering systems require periodic cleaning or replacement. To avoid the time, expense, and inconvenience of shutting down the system to remove the filter element for cleaning and/or replacement a number of devices have been heretofore proposed which include means for cleaning the element in place. This is usually accomplished by providing means either automatically or selectively operable to eject a flow of the system fluid through the element in a direction reverse to normal flow through the element. In many of these devices the foreign matter dislodged from the element is thrown back into the system on the inlet side of the element where upon resumption of operation of the system it soon again clogs the element.

In some systems the fluid being used to clean the element carries the particles out of the device. While this produces a more effective cleaning of the element it results in a substantial loss of fluid and system pressure.

The present invention provides a filter device which includes means selectively operable to clean the filter element without requiring the element to be removed from the filter housing. The filter device is provided with a filter chamber and a cleaning chamber and means are provided which are operable to move the filter element from the filter chamber to the cleaning chamber when it is desired to clean the element. A separate fluid preferably in the form of pressurized air is then directed through the filter element in a direction reverse to the normal fluid flow through the element to dislodge particles accumulating on the filter element and to deposit these particles in the cleaning chamber where they can be collected and removed from the system. Bypass valve means are provided to permit the continued operation of the fluid system as the element is being moved to the cleaning chamber and is being cleaned. Air is preferred as a cleaning fluid since a source of pressurized air is readily available in areas such as factories or the like where such fluid systems are generally used. Pressurized air is not generally used for cleaning filter elements without removing the element from the filter device for the reason that it is necessary to insure that the air will not become mixed with the working fluid. By moving the filter element to a separated cleaning chamber during the cleaning of the element this problem is avoided.

It is an object then of the present invention to improve self cleaning filtering devices by providing means selectively operable to move the filter element of such devices to an area separated from the filter chamber and to eject pressurized air through the filter element in a direction reverse to normal flow therethrough as it is being moved to the cleaning chamber.

It is still another object of the present invention to more effectively clean the filter element of a fluid system in place by providing means operable to eject a flow of fluid through the filter element in a direction opposite the normal fluid flow therethrough and to carry the foreign particles dislodged thereby to a cleaning chamber separated from the working fluid of the system.

It is yet another object of the present invention to improve self cleaning filtering systems by providing a filter chamber, a filter element normally disposed within the filter chamber, means defining a cleaning chamber separated from the filter chamber, means selectively operable to move the filter element from the filter chamber to the cleaning chamber, and means directing a cleaning fluid through the filter element in a direction opposite the flow of the working fluid therethrough as the filter element is being moved to the cleaning chamber.

It is still another object of the present invention to improve self cleaning filtering systems by providing a filter chamber, a filter element normally disposed within the filter chamber, means selectively operable to move the filter element to a position above the level of fluid in the filter chamber, means for cleaning the filter element as it is being moved with a reverse flow of air or other fluid directed through the element, and means replacing the filter element back below the level of fluid in the filter chamber after it has been cleaned.

It is still another object of the present invention to improve self cleaning filtering systems by providing a filter chamber, a filter element normally disposed within the filter chamber, means moving the filter element to a cleaning chamber and ejecting a flow of fluid in a direction reverse to normal flow through the filter element to thereby clean the element, means operable upon the filter element being moved to the cleaning chamber to open a bypass path around the filter element to thereby permit continued operation of the filtering system while the filter element is being cleaned and means moving the filter element back into the filter chamber after it has been cleaned.

Still further objects and advantages of the present invention will readily occur to one skilled in the art to which the invention pertains upon reference to the following drawings in which like reference characters refer to like parts throughout the several views and in which FIG. 1 is a cross-sectional view of one preferred filter device of the present invention illustrating the filter assembly in an operating position and showing some components of a preferred fluid system diagramatically.

Figures 2, 3:
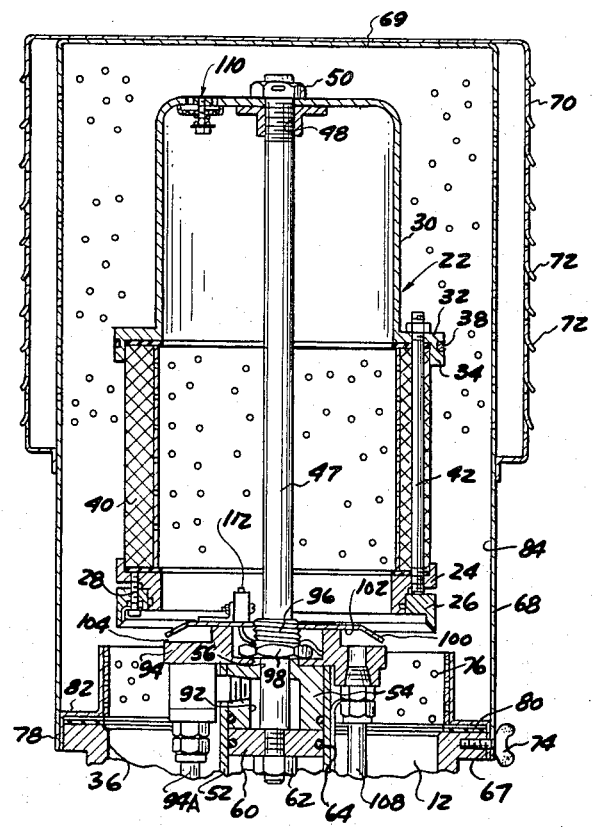

FIG. 2 is a fragmentary view illustrating the filter assembly shown in FIG. 1 in a cleaning position, and FIG. 3 is a view similar to FIG. 2 but illustrating another preferred filter device of the present invention in an operating position.

Now referring to the drawings for a more detailed description of the present invention, FIGS. 1 and 2 illustrate one preferred filter device as comprising a substantially cylindrical housing 10. The housing 10 is hollow as illustrated to form a filter chamber 12. An inlet 14 opens radially through the housing 10 to the filter chamber 12 and a plurality of annularly spaced outlets 16 open axially to the filter chamber 12 at one end of the housing 10. An arcuate inlet chamber 18 provides communication between the inlet 14 and the filter chamber 12 around each end of an arcuately formed baffle portion 20 formed in the housing 10.

The filter device further comprises a filter assembly generally indicated at 22 and mounted in the housing 10 for axial movement within the filter chamber 12. The filter assembly 22 comprises a pair of lower annular flange members 24 and 26 secured together by a plurality of annularly spaced bolts or screws 28 and an upper elongated substantially cylindrical cover member 30. The cover member 30 is closed at its upper end as shown and is provided at its lower end with a radially outwardly extending flange portion 32. An axially downwardly extending flange portion 34 is formed at the peripheral edge of the flanged portion 32. The inner wall of the housing member 10 is formed to provide a guide surface 36 axially slidably supporting the flange portion 34 of the cover member 30. A piston ring seal 38 is carried by the flange portion 34 to prevent fluid leakage between the housing 10 and the flange portion 34. A substantially cylindrical filter element 40 is sandwiched between the flange portion 34 of the cover member 30 and the flange member 24. A plurality of annularly spaced elongated bolt members 42 lock the flange member 24 to the flange portion 34 of the cover member 30 to thereby lock the filter element 40 in place. The housing 10 is provided with a radially inwardly extending portion 44 which provides a seat for the lower edge of flange member 26 to limit the downward axial movement of the filter assembly 22. The flange members 24 and 26 are provided with a central opening 46 which provides communication between the interior of the filter element 40 and the outlets 16. Thus normal fluid flow through the filter device is radially inwardly from the inlet chamber 18 through the filter element 40 and axially downwardly through the opening 46 to the outlets 16.

An elongated rod 47 is received in a threaded opening 48 provided in the upper portion of the cover member 30 and extends axially downwardly through the filter assembly 22 and is locked to the cover member 30 by a nut 50. A tubular member 52 is disposed axially within the filter chamber 12 and is secured at its lower edge to the housing 10 by means of a mounting member 53 and a nut and bolt 55. The tubular member 52 extends axially through the filter chamber 12 and is closed at its upward end by a closure member 54. The closure member 54 is provided with an axial opening 56 which axially slidably receives the elongated rod 47. The free end of the rod 47 carries a piston 60. The piston 60 is locked to the end of the rod 47 by means of a nut 62 and axially slidably engages the inner peripheral wall of the tubular member 52. An O-ring seal 64 is provided to prevent fluid leakage past the piston 60. As the invention has thus far been described it is apparent that axial movement of the piston 60 will produce a corresponding axial movement of the filter assembly 22 since the piston 60 and the filter assembly 22 are secured one to the other by the elongated rod 47.

The end of the housing 10 opposite the outlets 16 is opened as at 66 to permit the filter assembly 22 to be moved axially out of the filter chamber 12. A radially outwardly extending flange portion 67 is formed at the open end of the housing 10 and provides the means by which a cover structure 68 is secured to the housing 10. The cover structure 68 is formed of side walls of a perforated construction at their upper ends as illustrated and is preferably closed by an imperforate top plate 69. A shroud structure 70 encompasses the perforated upper end of the cover structure 68 and is provided with a plurality of vents 72. The cover structure 68 is preferably removably secured to the flange portion 67 of housing 10 by a plurality of screw members 74. A filter structure 76 is provided with an axially extending flange portion 78 adapted to be sandwiched between the flange portion 67 of the housing 10 and the cover structure 68 so that the screw members 74 position the filter structure concentrically about the cover member 30 of the filter assembly 22. A sealing member 80 is preferably disposed intermediate a radially extending portion 82 of the filter structure 76 and the upper surface of the flange portion 67 of the housing member 10. The cover structure 68 defines a cleaning chamber 84 of sufficient axial length to receive the greater portion of the filter assembly 22 as can best be seen in FIG. 2.

A preferred means of moving the filter assembly 22 from the filter chamber 12 into the cleaning chamber 84 and back again to the filter chamber 12 will now be described. The preferred means comprises a conventional four-way solenoid actuated valve 86 adapted to be connected to a source of air under pressure (not shown). The mounting member 53 is provided with an axial recess 88 opening to the lower surface of the piston 60. The recess 88 is connected to the source of air pressure (not shown) through the four-way valve 86 by means of conduit 90. The member 54 is provided with an axial recess 92 encompassing the rod member 47 and connected to the source of air pressure through the valve 86 by conduit 94A. Thus with suitable energization of the solenoid actuated valve 86 air under pressure can be directed to the recess 92 and exhausted from the recess 88 or air under pressure can be directed to the recess 88 and exhausted from the recess 92. It is apparent that if air under pressure is supplied to the interior of the tubular member 52 through the recess 92 and exhausted from below the piston 60 from the recess 88 the piston 60 will be moved axially downwardly to the position illustrated in FIG. 1. In this position the filter assembly 22 is in its lowermost position with the filter element 40 disposed intermediate the inlet 14 and the outlet 16. This is the normal operating position of the filter device and fluid entering the housing 10 through the inlet 14 will pass through the filter element 40 before being discharged through the outlets 16.

When the solenoid actuated valve 86 is energized to direct air pressure to the recess 88 provided in member 53 and to exhaust pressure from the recess 92 provided in member 54, the piston 60 will be moved axially upwardly in the tubular member 52. The upward movement of the piston 60 will produce a corresponding upward axial movement of the filter assembly 22 since the piston 60 and the filter assembly 22 are secured one to the other by the rod member 47. This will produce a movement of the filter assembly 22 toward the position illustrated in FIG. 2. The filter assembly 22 will move toward a position within the cleaning chamber 84 formed by cover structure 68 and will remain in this position until air is exhausted from beneath the piston 60 and pressure is provided in the recess 92.

Means are provided to utilize air pressure to clean the filter element 40 as the filter assembly 22 is being moved from the normal operating position as illustrated in FIG. 1 toward the cleaning position illustrated in FIG. 2. The cleaning means comprises a manifold member 94 secured to a threaded boss portion 96 of the member 54 by a nut 98. A deflector 100 is secured to the manifold member 94 to form an annular chamber 102 and an annular peripheral discharge opening 104. A conventional solenoid actuated three-way valve member 106 is mounted exteriorly of the housing structure 10 and is adapted to be connected to a source of air under pressure (not shown). The valve member 106 is operable upon being actuated to direct a pressurized air stream to the chamber 102 through a conduit 108.

The filter device of the present invention as heretofore explained is normally in the position as illustrated in FIG. 1 with air pressure supplied to the recess 92 to maintain the piston 60 in its lowermost position. In this position fluid is directed through the inlet 14 past the baffle member 20, radially inwardly through the filter element 40 and axially downwardly through the outlets 16. When the filter element 40 has become clogged, the valve 86 is actuated to exhaust air pressure from the recess 92 and to supply air under pressure to the recess 88. This causes the piston 60 and therefore the filter assembly 22 to move axially upwardly toward the position illustrated in FIG. 2. Substantially simultaneously with the movement of the filter assembly 22 upwardly, the valve 106 is actuated to provide air under pressure to the chamber 102. As the filter element 40 moves out of the filter chamber 12 and into the cleaning chamber 84, it will move slowly past the annular discharge opening 104 and this will produce an annular stream of air passing through the filter element 40 in a direction opposite to normal fluid flow therethrough to thereby dislodge the foreign particles tending to clog the filter element 40 and to deposit those particles within the cleaning chamber 84. The perforated construction of the upper portion of cover structure 68 and the vents 72 of the shroud structure 70 permit the air discharged through the filter element 40 to escape from the cover structure 68 but prevent the foreign particles from doing so. When the filter assembly 22 has reached the position illustrated in FIG. 2, the entire surface of the filter element 40 will have been subjected to the reverse flow of air produced through the discharge opening 104 and will therefore have been cleaned. The valve 86 is then actuated to exhaust pressure from beneath the plunger member 60 and to produce pressure at the recess 92 to return the filter assembly 22 to the position illustrated in FIG. 1. The valve 106 is actuated to cut off the supply of air to the chamber 104 either simultaneously with the actuation of the valve 86 or if desired air can be continued to be supplied to the chamber 102 as the filter element 40 is again being moved past the discharge opening 104 on its way back to the filter chamber 12. A venting means 110 provided in the cover member 30 permits air to escape from the cover member 30 as the filter assembly 22 is being moved back again to the filtering position.

It is to be noted that the filter device of the present invention can continue to operate even with the filter assembly 22 in its cleaning position. As the members 24 and 26 of the filter assembly move axially upwardly past the inlet chamber 18 a bypass path is opened directly from the inlet 14 to the outlets 16 so that it is not necessary to shut down the fluid system while the filter element 40 is being cleaned.

A switch means 112 may be provided if desired to actuate the valve member 106. With the particular switch means 112 illustrated, the cap member 30 is used to actuate the valve 106 so that as the cap member is moved away from the switch means 112, the valve 106 is energized to open air flow to the chamber 102. The air flow will continue through valve 106 until the cap member 30 returns to the position illustrated in FIG. 1 and engages the switch 112 to energize the valve 106 to a position closing air flow to the chamber 102.

It is apparent that a filter device has been described which permits continued operation of the fluid system while the filter element is being cleaned. The system fluid is not used to produce the cleaning action so that there is no loss of either system fluid or system pressure during the cleaning operation. Further, since the filter element 40 is moved from the filter chamber 12 out of the system fluid and into a separated cleaning chamber 84 during cleaning there is little chance of the air which is being used to clean the filter element 40 from becoming mixed with the system fluid. The foreign matter deposited in the cleaning chamber can be readily removed by removing the cover structure 68. It is also to be understood that although a preferred device has been described which is selectively operable to clean the filter element 40 very minor changes would be necessary to make the system fully automatic.

FIG. 3 discloses another preferred embodiment of the present invention substantially similar to the embodiment described with reference to FIGS. 1 and 2, but in which the cover structure 68 has been replaced by another cover member 168. The cover member 168 preferably comprises an annular side wall 170 secured to the flange portion 67 of the housing structure 10 by screw members 172 and a top member 174 connected to the upper annular edge of the side wall 170 by a pleated flexible member 176. The top member 174 is preferably secured to the end of an elongated rod 147 by a bolt and screw member 178 so that the top member 174 moves axially with the filter assembly 22. Venting means 180 are provided in the top member 174 and comprises a closed filter structure 182 encompassing a plurality of spaced slots 184.

It is apparent that the preferred modification of FIG. 3 operates substantially similar to the embodiment described above with reference to FIGS. 1 and 2. However, to conserve space, the cover structure 168 is formed to collapse and expand with movement of the filter assembly 22. When the filter assembly 22 is in the filtering position, that is, in the position illustrated in FIG. 3, the top member 174 is moved downwardly and the material 176 is pleated as illustrated. When the filter assembly 22 is moved axially upwardly to the cleaning position, the top member 174 is also moved upwardly. This upward movement of the top member 174 away from the side wall 170 of the cover structure 168 produces an expansion of the flexible material 176 so that an expanded cleaning chamber is produced to accommodate the filter assembly 22 in its cleaning position.

It is apparent that although I have described but several embodiments of my invention many changes and modifications can be made therein without departing from the spirit of the invention as expressed by the appended claims.

I claim:
1. In a filtering system,
    (a) means defining a filter chamber, and a cleaning chamber separated from said filter chamber,
    (b) a filter element normally disposed within said filter chamber,
    (c) means directing a normal flow of fluid from said filter chamber through said filter element in one direction,
    (d) means operable to move said filter element from said filter chamber to said cleaning chamber, and
    (e) means operable to direct a second flow of fluid under pressure through said filter element in a direction opposite to normal fluid flow therethrough as said filter element is being moved from said filter chamber to said cleaning chamber, said last mentioned means subjecting the entire filtering area of said filter element to complete exposure to said second flow of fluid when said filter element has been entirely positioned within said cleaning chamber, said last mentioned means defining an outlet and said filter element moving means is operable to move the outlet side of said filter element past said outlet and closely adjacent thereto upon movement of said filter element from said filter chamber to said cleaning chamber.
2. The filter system as defined in claim 1 and in which said filter element is substantially cylindrical and said moving means is operable to move said filter element axially from said filter chamber to said cleaning chamber.
3. The system as defined in claim 1 and in which said filter element moving means comprises,
    (a) a piston fixed to said filter element and operable upon being axially moved to axially move said filter element, and
    (b) means operable to axially move said piston.
4. The system as defined in claim 3 and in which said second fluid is air.
5. In a filter system,
    (a) means defining a filter chamber and a cleaning chamber separated from said filter chamber,
    (b) a substantially cylindrical filter element axially slidably carried in said chambers and normally being disposed within said filter chamber,
    (c) means directing a flow of fluid from said filter chamber through said filter element in one direction,

(d) means operable to axially move said filter element from said filter chamber to said cleaning chamber, and (e) means operable to direct a flow of second fluid through said filter element and into said cleaning chamber in a direction opposite the flow of said first mentioned fluid through said filter element during movement of said filter element from said filter chamber to said cleaning chamber, said last mentioned means subjecting the entire filtering area of said filter element to complete exposure to said second flow of fluid when said filter element has been entirely positioned within said cleaning chamber, said last mentioned means defining an annular outlet and said filter element moving means is operable to move the outlet side of said filter element past said annular outlet and closely adjacent thereto upon movement of said filter element from said filter chamber to said cleaning chamber.

6. A self cleaning filter device comprising, (a) a housing structure defining a filter chamber, an inlet and an outlet open to said filter chamber, and a cleaning chamber separated from said filter chamber, (b) a filter assembly axially slidably mounted in said housing structure and movable between said filter chamber and said cleaning chamber, (c) said filter assembly comprising a filter element normally disposed within said filter chamber intermediate said inlet and said outlet to provide a normal flow of fluid through said filter element in a first direction, (d) means operable to move said filter element from said filter chamber to said cleaning chamber and from said cleaning chamber to said filter chamber, (e) means operable upon said filter element being moved toward said cleaning chamber and during movement thereof to direct a flow of fluid through said filter element and into said cleaning chamber in a direction opposite to normal fluid flow through said filter element, said last mentioned means subjecting the entire filtering area of said filter element to complete exposure to said second flow of fluid when said filter element has been entirely positioned within said cleaning chamber, said last mentioned means defining an annular outlet and said filter element moving means is operable to move the outlet side of said filter element past said annular outlet and closely adjacent thereto upon movement of said filter element from said filter chamber to said cleaning chamber.

7. A filter device as defined in claim 6 and including valve means actuated by said filter element being moved from said filter chamber to said cleaning chamber to open a fluid path directly connecting said inlet to said outlet and bypassing said filter element.

8. In a filtering system, (a) means defining a filter chamber, and means connected to said first mentioned means and defining a cleaning chamber separated from said filter chambers, (b) a filter element normally disposed within said filter chamber, (c) means normally directing fluid from said filter chamber through said filter element in one direction, (d) said cleaning chamber defining means being expandible and collapsible and means operable to move said filter element from said filter chamber to said cleaning chamber and at the same time to move said cleaning chamber defining means from a collapsed position to an expanded position to accommodate said filter element, and (e) means operable to direct a second flow of fluid under pressure through said filter element in a direction opposite the normal fluid flow therethrough as said filter element is being moved from said filter chamber to said cleaning chamber.

9. In a filtering system:

(a) a housing defining a filter chamber and a flexible member connected with said housing defining a cleaning chamber separated from said filter chamber, said flexible member being movable between a collapsed and an expanded position, (b) a filter element normally disposed within said filter chamber, (c) means directing fluid to be filtered to said filter chamber and through said filter element in one direction, (d) means operable to move said filter element from said filter chamber to said cleaning chamber and at the same time operable to move said flexible member from said collapsed position to said expanded position, said expanded cleaning chamber accommodating said filter element, and (e) means operable to direct a second flow through said filter element and into said cleaning chamber in a direction opposite of said first mentioned fluid.

10. The system as defined in claim 9 and in which the second fluid is air and said second mentioned fluid directing means comprises means defining an annular outlet disposed within said filter element and said filter element moving means is operable to move said filter element past said annular outlet and closely adjacent thereto upon movement of said filter element from said filter chamber to said cleaning chamber, and means to actaute said second flow of fluid during movement of said filter element, said last mentioned means subjecting the entire filtering area of said filter element to complete exposure to said second flow of fluid when said filter element has been entirely positioned within said cleaning chamber.

11. A filter device as defined in claim 9 and including valve means actuated by said filter element upon the movement of said element from said filter chamber to said cleaning chamber to open a fluid path directly connecting said inlet and said outlet and bypassing said filter element.

References Cited

UNITED STATES PATENTS

| 897,123 | 8/1908 | Mensch | 210—390 X |
|---|---|---|---|
| 937,676 | 10/1909 | Elliott | 210—390 X |
| 968,822 | 8/1910 | Weinland | 210—390 X |
| 1,171,611 | 2/1916 | Hauer | 210—390 |
| 1,906,391 | 5/1933 | McKinley | 210—411 |
| 2,184,177 | 12/1939 | Burrell | 210—108 X |
| 3,043,434 | 7/1962 | Stram et al. | 210—108 X |
| 3,254,772 | 6/1966 | Hornbostel | 210—411 X |

FOREIGN PATENTS 244,754 1/1963 Australia.

REUBEN FRIEDMAN, *Primary Examiner.*

D. M. RIESS, *Assistant Examiner.*